United States Patent [19]
Dawes et al.

[11] Patent Number: 5,991,493
[45] Date of Patent: Nov. 23, 1999

[54] OPTICALLY TRANSMISSIVE BONDING MATERIAL

[75] Inventors: Steven B. Dawes; Andrea L. Sadd, both of Corning, N.Y.

[73] Assignee: Corning Incorporated, Corning, N.Y.

[21] Appl. No.: 08/956,177

[22] Filed: Oct. 22, 1997

Related U.S. Application Data

[60] Provisional application No. 60/032,961, Dec. 13, 1996.

[51] Int. Cl.$^6$ ........................................................ G02B 6/00
[52] U.S. Cl. ............................................................... 385/141
[58] Field of Search ...................................... 385/141–145

[56] References Cited

U.S. PATENT DOCUMENTS

| | | | |
|---|---|---|---|
| 4,738,873 | 4/1988 | Roba et al. | 427/163 |
| 5,063,081 | 11/1991 | Cozzette et al. | 427/2 |
| 5,770,275 | 6/1998 | Raman et al. | 427/535 |
| 5,858,526 | 1/1999 | Floch et al. | 428/327 |

*Primary Examiner*—John D. Lee
*Assistant Examiner*—Victoria D. Hao
*Attorney, Agent, or Firm*—Milton M. Peterson

[57] ABSTRACT

An optically transmissive material and the production of optically transmissive articles therefrom, in particular a bond between two optically transmissive components including optical fibers and planar devices.

50 Claims, 1 Drawing Sheet

OPTICALLY TRANSMISSIVE BONDING MATERIAL

This application claims benefit of provisional application Ser. No. 60/032,961 filed Dec. 13, 1996.

FIELD OF THE INVENTION

The field is an optically transmissive material and method that are useful in bonding two components, such as optical fibers and/or planar structures, to form an optical network.

BACKGROUND OF THE INVENTION

Optical waveguide structures fabricated in planar forms can perform a variety of functions in optical light-paths. These include optical coupling in various configurations, such as multi-channel star arrays, and multiplexing or demultiplexing through phasar or grating devices. Such waveguides also hold the promise of being lower in cost than discrete optical devices which are fabricated from fiber and micro-optic components. In the future, they may provide a platform for hybrid, electro-optic devices.

For each signal to be processed, the optical waveguide must be connected to an optical fiber carrying an input signal, and to a second optical fiber carrying the processed signal. Traditionally, these connections, commonly referred to as "pigtails," have been accomplished with organic adhesives, such as methacrylate or epoxy adhesives. These polymeric adhesives offer simple fabrication, fair index matching, and good bonding characteristics.

However, they are hydratively unstable. This limits their usefulness in wet environments such as are encountered in underwater and high humidity applications. It has also been reported that many of these adhesives have questionable stability when subjected to environmental extremes in temperature and pressure.

Even a slight deterioration in the optical properties of the adhesive will seriously impair transmission of optical signals through the fiber-waveguide network. Thus, instability can have disastrous consequences, making the organic, or "soft," pigtail unsuitable for many applications.

The need for a stable, optical fiber-to-planar waveguide connection has led to a vitreous seal using a glass ftit as such, or admixed with a mill addition. The resulting joint is hydratively stable and relatively strong. However, it may involve stresses caused by differences in the coefficients of thermal expansion between the components; also a higher than desired sealing temperature.

The present invention is directed to overcoming these and other deficiencies in the art.

SUMMARY OF THE INVENTION

The present invention relates to an inorganic-organic hybrid material that comprises an extended matrix containing silicon and oxygen atoms with at least a fraction of the silicon atoms in the extended matrix being directly bonded to at least one hydrocarbon moiety.

The present invention also relates to a method of producing an article from the material which comprises:
preparing a material precursor comprising at least one silane selected from the group consisting of a tetraalkoxysilane, an alkyltrialkoxysilane, or an aryltrialkoxysilane and a source of a hydrocarbon moiety,
at least partially hydrolyzing and condensing the precursor material to a viscosity suitable for forming the article.

In a specific aspect, the invention is an optically transmissive article, and a method of producing a bond between two transmissive components which comprises using the partially hydrolyzed and cured material as a bonding composition aligning the components in a spaced relationship to form a gap, filling the gap with the bonding composition to form a connection between the components completing hydrolysis and curing of the bonding composition under conditions effective to form a bond of an inorganic-organic, hybrid material that comprises an extended matrix containing silicon and oxygen atoms with at least a fraction of the silicon atoms being directly bonded to at least one hydrocarbon moiety, whereby the optically transmissive components are connected together.

The present invention further relates to a hydrolyzable and curable sol-gel composition. The sol-gel composition includes at least one silane selected from the group consisting of a tetraalkoxysilane, an alkyltrialkoxysilane, and an aryltrialkoxysilane.

The methods and compositions of the present invention have been developed for use in connecting components of optically transmissive networks, and are so described. Such networks include optical fibers and optical planar waveguides, connected by an inorganic-organic, "hard" pigtail. The connections thus made exhibit improved hydrative stability and resistance to temperature, pressure and humidity extremes. The connections can also minimize back-reflection by providing a close index of refraction match to the core of the waveguide. This obviates the need to make expensive, precision-machined facets in the optically transmissive materials. Furthermore, they can be manufactured without the application of high heat. This avoids stresses caused by differences in coefficients of thermal expansion between the components.

It is contemplated, however, that the unique combination of properties found in the new materials are valuable in bulk products as well. These include, for example, molded optical networks, which may, optionally be laminated within a substrate, specifically designed components and like optically transmissive articles.

DETAILED DESCRIPTION OF THE INVENTION

The article of the present invention is an optical network comprising at least two optically transmissive components connected with a bond. The invention arose from research directed at bonding an optical fiber to a planar waveguide structure, a practice known as "pigtailing." Accordingly, it is so described. However, its broader application will be evident.

The shortcomings of "soft" organic bonds and "hard" glass bonds have been noted. A key feature of the invention is an improved "hard" bond for connecting optically transmissive components.

Such a bond should have a good refractive index match to the components close to 1.46. It should also have a total signal loss of not over 0.2 db. The bond must be insensitive to hydrative effects (85° C. at 85% relative humidity for thousands of hours), and must be stable over a thermal cycling range of −40° to +85° C. The pigtail preferably has sufficient strength to support a one 1b. tensile load.

Finally, the bond (pigtail) must lend itself to rapid and flexible production processes. For example, it may be desired to successively bond a substantial number of fibers to a multiport, planar structure. In such a process, a bond desirably is made in no more than two minutes while retaining other properties.

Figure 1:
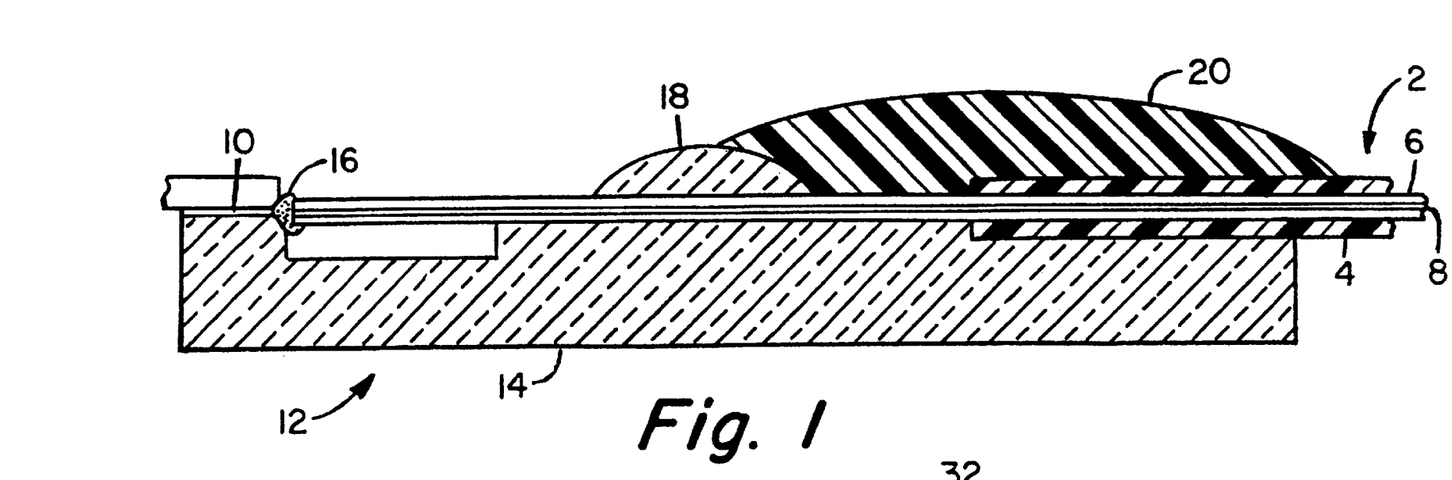
FIG. 1 is a cross-sectional drawing of a joint between an optical fiber and an optical planar waveguide illustrating one form of optically transmissive article according to the present invention.
Figure 2:
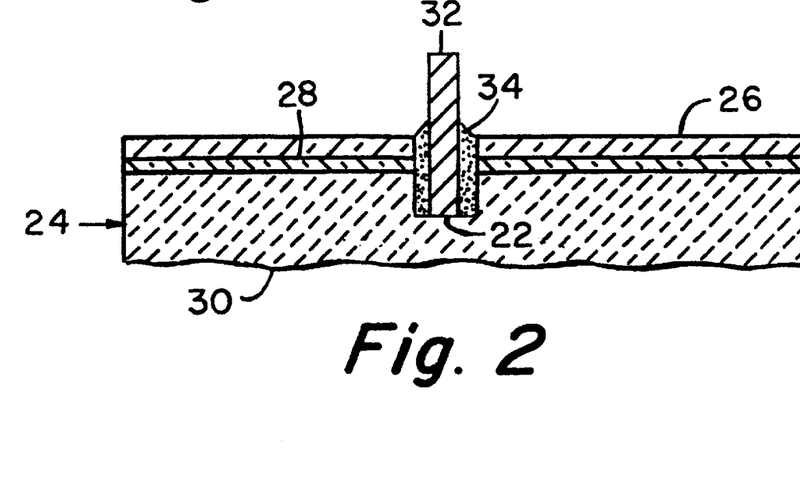
FIG. 2 is a cross-sectional drawing illustrating a modified joint between an optical planar waveguide and an optically active component according to the present invention.

A preferred form of the optical network comprises an optical fiber and a planar structure such as an amplifier or a coupler. The strength of the connection in this embodiment can be enhanced by attaching the fiber to the waveguide at additional locations. FIGS. 1 and 2 in the accompanying drawing are cross-sectional views showing two forms of the inventive article.

Figure 1A:
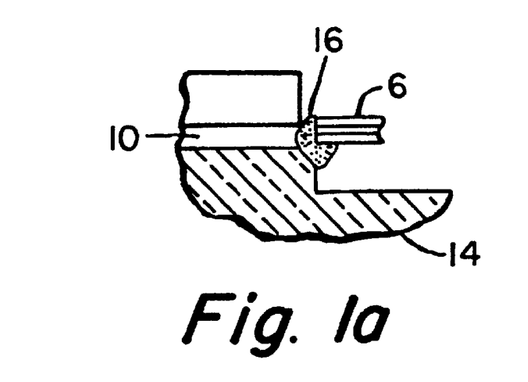
FIG. 1a is an enlarged, cross-sectional drawing of a portion of FIG. 1 showing the joint 16 between optical fiber 2 and planar device 10.

In FIGS. 1 and 1a optical fiber 2 has a portion of its polymeric coating 4 removed to expose a segment of cladding 6. Core 8, contained within cladding 6, is aligned with planar device 10, which is supported by substrate 14 of planar waveguide 12. Core 8 is optically connected to planar device 10 with bonding material 16 in accordance with the method of the present invention.

Optical fiber 2 is also attached to planar waveguide 12 with mass 18. Mass 18 contacts cladding 6 of optical fiber 2 and also bonds to substrate 14 of optical waveguide 12. Mass 18 can be a glass formed by sol-gel processes, a fired glass frit paste, or a photocured polymer. Optical fiber 2 is also attached to planar waveguide 12 with overcoating material 20. Overcoating material 20 covers, protects and bonds to cladding 6 and polymeric material 4 of optical fiber 2 as well as bonding to substrate 14 of optical waveguide 12. This strengthens the attachment of optical fiber 2 to optical waveguide 12.

The optical network can, alternatively, include a planar optical waveguide having a slot cut therein and an optically active component inserted into the slot. Suitable optically active components may modify the character of the light passing through a waveguide, such as by applying a polarizing shift, isolation, or filtering.

FIG. 2 shows a typical configuration of a planar waveguide with such a component added. Slot 22, machined into planar waveguide 24, has a depth sufficient to penetrate through overclad layer 26, through core layer 28, and, optionally, into substrate 30. Slot 22 has a width sufficient to receive optically active component 32. Preferably, it has additional width to permit optimizing the position of optically active component 32 to minimize transmission loss. A hydrolyzed, bonding composition 34 is applied to fill slot 22 and wet optically active component 32. The composition fills slot 22. It is cured by heating to immobilize optically active component 32 in its optimal position. Preferably, bonding material 34 matches the index of refraction of core layer 28 to minimize back-reflection. In addition, bonding material 34 should be stable to thermal cycling and damp environments.

Practice of the invention is initiated by providing two optically transmissive components selected from optical fibers, optically active components and planar optical waveguides. The invention is particularly applicable to inorganic components such as silica, aluminosilicate, or borosilicate glass components.

Where one of the components is an optical fiber, it is preferred that all material surrounding the core and clad, such as the polymeric jacket, be removed. This can be effected by conventional stripping tools for optical fiber.

The method of the present invention can also be used to connect a planar waveguide with a "drop-in" optically active component as shown in FIG. 2. This may be a passive optical component, such as a beam splitter or an optical filter. These components are typically inserted into slots machined into the surface of the planar waveguide. These drop-in configurations require that back-reflection at the interface between the drop-in component and the planar waveguide be low. This requires that the drop-in component, typically both surfaces of the drop-in component, be optically connected to the planar waveguide.

Alignment in such an application can be accomplished actively or passively. For example, a drop-in component can be actively held in a loss-minimized position during contact of the components and final curing of the bonding composition. Alternatively, alignment can be ensured by providing a positional slot (commonly referred to as a positioning groove), and simply inserting the drop-in component into the slot. The contact point is a line defined by the intersection of the drop-in component and the side of the slot. Curing the hydrolyzed bonding composition connects the drop-in component and the optical waveguide along this line. This reduces back-reflection at the interface.

Where the optically transmissive components are two optical fibers, alignment can be effected by butting the ends of the optical fibers to each other. Where an optical fiber is to be connected to a planar waveguide, alignment can be effected by butting an end of the optical fiber with an edge of the planar waveguide. In either case, the components are aligned at the contact point. To allow for expansion during thermal treatment, the components must be slightly spaced for bonding, preferably about 5–20 microns.

Precise alignment of the components may be obtained by directing a laser beam through one of the components, such as an optical fiber. Throughput of the laser beam into the other component is monitored. The relative spatial positions of the two components are adjusted until throughput is maximized.

The optically transmissive components may be coated with the bonding composition at their respective contact points prior to aligning. Coating can also be carried out by introducing a drop of the bonding composition between the spaced components so that it spans the gap. Alternatively, the bonding composition can be sprayed or painted onto the aligned contact point, or one or both of the components may be dipped into a vessel containing the bonding composition. Alignment of the components may be adjusted subsequent to contacting them with the bonding composition.

Practice of the invention further involves preparing a bonding composition. This comprises a mixture of hydrolyzable precursors composed essentially of at least one alkoxysilane selected from the group consisting of tetraalkoxysilanes, alkyltrialkoyxsilanes and aryltrialkoxysilanes. Optionally, it contains modifiers as noted, infra.

The mixture may be dissolved in a solvent such as an alcohol and hydrolyzed by addition of acid and water. The composition is aged while hydrolysis and condensation proceed to form a viscous bonding composition. This partially hydrolyzed and condensed material is hereafter termed the "bonding composition" to contrast with the ultimate bond wherein hydrolysis and curing are essentially complete.

It is desirable to drive the hydrolysis and condensation reactions to a sufficient degree so that no precursor is lost during solvent evaporation. Studies have shown that sufficient aging at room temperature for this purpose requires on the order of 50 hours. It has been found that mild heating of the mixture below 100° C. can shorten the time to less than 5 hours. In particular, a comparable degree of condensation (about 80%) was achieved by heating at about 75° C. for three hours. Quite surprisingly, gels produced by the accelerated aging process were found less prone to cracking at high heating rates in forming the ultimate bond.

Tetraalkoxysilanes are silicon atoms having four alkoxy groups bound thereto. The four alkoxy groups are usually the same, but this is only for convenience. Alkoxy, as used herein, is meant to include the deprotonated form of any alcohol, including aliphatic alcohols.

Alkyltrialkoxysilanes are silicon atoms having three alkoxy groups and one alkyl group bonded thereto. Alkyl is also meant to include arylalkyls. Alkyltrialkoxysilanes suitable for use in the practice of the present invention include, for example, methyltrimethoxysilane ("MTMS") and methyltriethoxysilane ("MTES").

Aryltrialkoxysilanes are silicon atoms having three alkoxy groups and one aryl group bonded thereto. As used herein, aryl also is meant to include alkylaryl moieties. Aryltrialkoxysilanes suitable for use in the practice of the present invention include, for example, phenyltrimethoxysilane ("PTMS") and phenyltriethoxysilane ("PTES").

The hydrolyzed bonding composition can advantageously include organic components which, on a microscopic level, modify the inorganic network formed by condensation of the silane, hydrolysis products. The organic component can modify the network with an organo-metallic bond to a silicon atom. Alternatively, the organic component can coexist as an interpenetrating, intermolecular, or intramolecular network within the inorganic network, which does not attach to a silicon atom.

Suitable organic components which can be incorporated into the hydrolyzed bonding composition include one or more hydrolysis products of inert network modifiers, active network modifiers, organic network-forming modifiers, reactive polymeric modifiers, reactive polymerizable modifiers, and non-interacting, interpenetrating network modifiers.

Inert network modifiers include alkylalkoxysilanes and arylalkoxysilanes, particularly those having the formula $(R^1)_n(R^2O)_{4-n}Si$, wherein n is 1, 2 or 3. $OR^2$ is an alkoxy moiety, such as ethoxy and methoxy. $R^1$ can be an alkyl moiety or an aryl moiety, including, for example, methyl, ethyl and phenyl.

The bonding composition can include from about 0 to about 100 mole %, preferably from about 50 to about 100 mole %, more preferably from about 50 to about 96 mole % of the hydrolysis product of the inert network modifier, such as the hydrolysis product of methyltriethoxysilane. Further details with respect to inert network modifiers can be found in the literature.

Active network modifiers are (substituted alkyl) alkoxysilanes and (substituted aryl)alkoxysilanes. At least one of the alkyl or aryl substitutents is a functional group capable of forming complexes with metal atoms or ions, such as an amino functional group, a mercapto functional group, or a hydroxy functional group. It is believed that the functional group promotes surface adhesion of the bonding composition to inorganic materials. Active network modifiers may also promote adhesion to organic surfaces.

Suitable active network modifiers are those having the formula $(R^3)_n(R^2O)_{4-n}Si$, wherein n is 1, 2 or 3 and wherein $OR^2$ is an alkoxy moiety. $R^3$ can be a amine-, carboxy-, mercapto- or hydroxy-substituted alkyl or aryl moiety. The hydrolysis product of the active network modifier is preferably present in an amount from about 1 to about 25 mole %.

As indicated above, the bonding composition can also include one or more hydrolysis products or organic network-forming modifiers, reactive polymeric modifiers, or reactive polymerizable modifiers. The hydrolysis products of these modifiers, when polymerized, are believed to form organic networks that are covalently bonded to the inorganic network via Si—C bonds.

Organic network-forming modifiers are (substituted alkyl)alkoxysilane compounds that are substituted with groups capable of participating in reactions with other like-substituted (substituted alkyl)alkoxysilane compounds.

Suitable network-forming modifiers include those having the formula $(^4)_n(R^2O)_{4-n}Si$, wherein n is 1, 2 or 3 and $OR^2$ is an alkoxy moiety, suitable examples of which are ethoxy and methoxy. R can be a substituted alkyl moiety or aryl moiety, such as an alkacryloxyalkyl-, an acryloxyalkyl-, a vinyl-, or an (epoxy-substituted)alkylsilane.

The hydrolyzed bonding composition can include from about 0 to about 95 mole %, preferably from about 0 to about 50 mole % of a hydrolysis product of an organic network-forming modifier, such as the hydrolysis product of methacryloxy-propyltriethoxysilane. When used to impart functional character, such as to permit photocuring, the hydrolysis products of organic network-forming modifiers are preferably present in an amount of from about 20 to about 50 mole %.

Where organic network-forming modifiers are employed, it can be particularly advantageous to include a photoinitiator in the hydrolyzed bonding composition. Suitable photoinitiators include titanocene radical photoinitiators, such as IRGACURE™ 784 or cationic ferrocinium photoinitiators, such as IRGACURE™ 261 (both available from Ciba Geigy, Ardsley, N.Y.). The photoinitiators, where employed, are preferably included in the bonding composition in amounts less than about 0.8 weight percent, preferably about 0.2 to about 0.8 weight percent.

Reactive polymeric modifiers are inorganic or organic polymers which are capable of participating in condensation reactions with hydrolyzed tetraalkoxysilanes, alkyltrialkoxysilanes, or aryltrialkoxysilanes.

Suitable reactive polymeric modifiers include those having the formula $(R^2O)_3O—Si—O—(P)_n—Si—O(OR^2)_3$, or $(HO)—(P)_n—OH$, where $(P)_n$ represents an organic polymer, such as a polytetramethylene oxide, and $OR^2$ is an alkoxy moiety, such as ethoxy and methoxy.

Other suitable reactive polymeric modifiers include polydialkylsiloxanes having the formula $R^5O$—[$Si(R^6)_2$—O]$_n$$R^5$, wherein n is an integer from about 2 to about 50, $R^5$ is a hydrogen, or an alkyl or aryl moiety, $R_6$ is an alkyl group, preferably a methyl group. Preferably, the reactive polymeric modifier is a polydimethylsiloxane having a molecular weight of from about 200 to about 900 g/mole, preferably about 550 g/mole.

The bonding composition can include from about 0 to about 40 mile %, preferably from about 4 to about 8 mole %, of the hydrolysis product of a reactive polymeric modifier.

Reactive polymerizable modifiers are substituted alkylalkoxysilane compounds which can form organic networks only in combination with a second polymerizable component which is reactive with the substitutent on the substituted alkylalkoxysilane compound. The second polymerizable component may or may not be bonded to an alkoxysilane.

The bonding composition can include from about 0 to about 95 mole %, preferably from about 0 to about 50 mole % of the hydrolysis product of the reactive polymerizable modifier. When used to impart functional character, such as to allow photocuring or increase the plasticity of the extended silicon-oxide matrix, the hydrolysis product of the reactive polymerizable modifier is preferably present in an amount of from about 20 to about 50 mole %. These reactive polymerizable modifiers contain a hydrolytically stable silicon-carbon bond.

Non-interacting interpenetrating network modifiers are organic polymers. Preferably, they do not contain groups capable of forming Si—C bonds with silicon atoms, or precursors to such organic polymers.

These non-interacting, interpenetrating network modifiers can be incorporated into the bonding composition in amounts of from about 0 to about 50 mole %. They may be used to impart functional character, such as to increase plasticity or to introduce photoactive polymers into the extended silicon-oxide matrix. They are preferably present in an amount of from about 5 to about 25 mole %. Further details with respect to these non-interacting interpenetrating network modifiers can be found, for example, in U.S. Pat. No. 5,412,016 to Sharp, which is hereby incorporated by reference.

Increased indices of refraction in the bond composition may be obtained by further including one or more reactive compounds, such as the alkoxide of an element selected from the group consisting of Ge, Ti, Zr, Hf, Er, Nd. The alkoxides can, optionally, be hydrolyzed to their hydrolysis products.

The amount of alkoxide, and the hydrolysis products thereof, collectively present in the bonding composition depends on the refractive index desired in the bond. Suitable amounts of alkoxide and hydrolysis products thereof may range from about 0 to about 25 mole %, preferably from about 0 to about 15 mole %.

The refractive index of the polymerized hydrolyzed bonding composition can also be varied by incorporating aryltrialkoxysilanes (particularly phenyltrialkoxysilanes), and/or aryltrifborosilanes (particularly phenyltrifluorosilanes) into the bonding composition.

The bonding composition can, optionally, contain a fluoride source, such as a hydrolysis product of a fluorosilane, for example, an alkylfluorosilane. Other suitable fluoride sources, such as hydrogen fluoride, ammonium bifluoride and other fluoride salts which dissociate, may be used. The incorporation of a fluoride source is advantageous where suppression of the ca. 3300 cm$^{-1}$ SiO—H infrared absorption band is desired. Such a case is where the material connecting the optically transmissive materials must pass infrared radiation without significant attenuation.

In a particularly preferred embodiment, an aryltrifluorosilane was included in the hydrolyzable precursor composition. It was found that the mixture of PDMS, MTES, PTES and PTFS could be hydrolyzed directly, that is, without the presence of a solvent. After an aging period, during which the water is consumed and the alcohol is produced, the sol is a clear liquid. The sol can then by "dried" by allowing the alcohol to evaporate over several hours at room temperature. The clear, colorless fluid becomes significantly more viscous, and continues to do so until it gelled. The viscous liquid can be thermally treated to provide the solid gel with a total mass loss of only about 10%. This permits greater flexibility in processing crack-free bonds.

The amount of fluoride source present in the bonding composition depends primarily on the acceptable level of infrared absorption. A significant reduction of the Si—OH absorption band can be achieved with the hydrolysis product of a fluorosilane ranging from 0 to about 25 mole %, preferably from about 5 to about 15 mole %.

Particularly preferred bonding compositions of the present invention are curable sol-gels which include a silane selected from the group consisting of a tetraalkoxysilane, an alkyltrialkoxysilane, an aryltrialkoxysilane, a trialkoxysilane, an alkacryloxypropyltrialkoxysilane and combinations thereof, in a total amount of from about 50 to about 95 mole %. The curable sol-gel composition also includes a network modifier selected from the group consisting of a monomeric dialkyldialkoxysilane, a diacryldialkoxysilane, and a polymeric polydialkylsilane in an amount of about 4 to about 25 mole %; an aryltrifluorosilane in an amount of about 5 to about 20 mole %; a tetraalkoxytitanium in an amount of about 0 to about 10 mole % and a tetraalkoxygermanium in an amount of about 0 to about 20 mole % all contents based on the total sol-gel composition.

Hydrolyzed bonding compositions can be prepared by adding water to precursor bonding compositions which contain an alkoxysilane. Hydrolysis begins immediately upon the addition of water, and results in the replacement of alkoxy groups with hydroxy groups. The rates of hydrolysis of the various silanes depend on the nature of the substitutents bonded to the silicon atoms. Therefore, it can be advantageous to begin the hydrolysis process of various alkoxysilanes (or alkoxides of other elements, such as tetraethoxygermanium) separately and mix them together after some or all of the alkoxy groups have been hydrolyzed.

The amount of water used in carrying out the hydrolysis phase of the process can vary widely. It may be about 25% to about 800% of the stoichiometric amount required to completely hydrolyze all of the alkoxy-silicon bonds present in the precursor bonding compositions based upon the reaction $2{\equiv}SiOR+H_2O\rightarrow{\equiv}Si-O-Si{\equiv}+ROH$. Preferably, the amount of water added is from about 75% to about 100% of the stoichiometric amount.

Hydrolysis can be carried out using the following general procedure. A precursor bonding composition, including a selected alkoxysilane, together with one or more of the optional additive modifiers, is dissolved in a suitable solvent. Preferably, the solvent is non-reactive with, and capable of solubilizing, all of the precursor bonding composition. The preferred solvent is ethanol. Where reaction rates of the precursors are sufficiently similar, the precursor bonding composition may be mixed and hydrolyzed directly, without a solvent.

Water and acid are added to the solution of the precursor bonding composition. The water and acid are first mixed in a solvent, which may be the same solvent used to dissolve the precursor bonding composition. The acid and water can be added all at once, slowly, either drop-wise or in several Aliquots. The addition is carried out over the course of 20 minutes to 8 hours, preferably 1 to 3 hours, preferably, while maintaining the reaction mixture at reflux and with stirring. After the addition is complete, the reaction mixture may be stirred at reflux for an additional period of time, preferably about 30 minutes. To precisely control the amount of water introduced into the reaction mixture, the addition and optional subsequent stirring and refluxing can be carried out in an inert atmosphere, such as nitrogen or argon. When reactions are conducted with no added solvent, the water is added in one or two aliquots, and mixed vigorously at temperatures from about 50 to about 90° C., until homogeneous.

Hydrolyzed bonding compositions containing primarily alkyl trialkoxides can be advantageously prepared by the following alternate general method. A precursor bonding composition, including a selected alkoxysilane, together with one or more of the optional modifiers, is prepared without the addition of solvent. Water in the desired amount is added to the precursor bonding composition. The addition of water can be carried out at room temperature, or in a hot water bath. Preferably, the precursor bonding composition, prior to addition of water, is at a temperature from about 60° C. to about 80° C. The amount of water with which the precursor bonding composition reacts is better controlled if the addition is conducted under conditions which exclude moisture in the ambient air, such as by capping the reaction vessel.

Addition of water to the precursor bonding composition frequently produces a phase separated mixture. In these circumstances, the phase separated mixture can be agitated to dissolve the water in the precursor bonding composition. Agitation is preferably carried out in a vessel isolated from the ambient atmosphere, such as with a cap. After agitation, the system is preferably vented (if capped) and then rested, preferably isolated from the ambient atmosphere, at a temperature from room temperature up to about 100° C. for a period of time from about 15 minutes to about 6 hours. After cooling, the hydrolyzed bonding composition can, optionally, be aged, preferably at room temperature and for from about 1 to about 10 days.

Both germanium and titanium alkoxides hydrolyze rapidly. It is desirable, therefore, when they are to be included in the precursor bonding composition, to delay their addition to the composition until the alkoxysilanes are at east partially hydrolyzed. The delay incorporates the germanium and titanium more uniformly into the inorganic matrix.

The hydrolysis reaction may be catalyzed by a mineral acid or an organic acid, preferably HCl. The amount of acid used in the hydration reaction can be from about 0 to about 5%, expressed in terms of equivalents of acid per mole of water used. When the precursor bonding composition contains a fluoride source, such as PTFS, the use of acid provides little advantage.

The amount of water used in the hydrolysis reaction can be from about 10% to about 200%, expressed in terms of moles of water per moles of hydrolyzable alkoxy group. The stoichiometric hydrolysis of one mole of alkoxy group requires 0.5 moles of water. In cases where a polydialkylsiloxane is contained in the precursor bonding composition, the amount of water is preferably from about 45% to about 55%.

The resulting hydrolyzed bonding composition can be stored at room temperature for from about 3 to about 30 days before use in connecting optically transmissive components. Shelf life can frequently be extended by employing dimethylformamide as the reaction solvent, or as a cosolvent with an alcohol.

In cases where the bonding composition contains germanium or titanium, its shelf life can be extended by adding the germanium or titanium alkoxide to the sol after hydrolysis of the alkoxy silanes is at least partially completed. Shelf life can also be extended by reducing the amount of water employed in the hydrolysis process, such as from about 50% to about 25% of the stoichiometric amount.

The shelf life of sols containing fluoride sources, such as PTFS, can be extended by reducing the amount of water employed, or by carrying out the hydrolysis reaction at lower temperatures. A reaction temperature of from about 30° C. to about 60° C. is preferred.

The bonding composition is applied to connect the two aligned components at their contact point. The bonding composition is then cured. Curing, or condensing, as used in this context, refers to the inorganic component of the hydrolyzed bonding composition. It can be effected at room temperature over a prolonged period of time. However, it is usually desirable to accelerate the process, such as by application of heat. Heat can be applied from any conventional source, such as a flame, a heat gun, a high temperature oil bath, or radiation, such as with a focused infrared laser.

The amount of heat applied is dependent on the presence of solvent in the preparation. A solvent free preparation largely avoids bubbling and cracking. With a solvent present, the heat applied must be controlled. It is desirable to cure the hydrolyzed bonding composition quickly. However, too rapid heating can cause significant trapping of solvent as bubbles, cracking due to rapid shrinkage, or misalignment of the components being connected. The temperature for curing is about 150° C. to about 300° C., preferably 225° C. to about 250° C. The cured bonding composition is sufficiently strong to withstand normal handling.

To minimize signal losses, alignment is actively maintained until the bonding composition spatially fixes the optical components relative to each other with sufficient strength to withstand typical handling. In some instances, the optical and thermal properties of the polymerized bonding composition can be improved by further consolidating the cured bonding composition. To this end, the cured bonding composition may be exposed to a higher temperature, but not sufficiently high to cause significant expansion of the components being connected.

In cases where the hydrolyzed bonding composition contains an organic network-forming modifier, and a photoinitiator, the bonding composition can be set to spatially fix the components without complete curing. The bonding composition can be set, for example, by exposing it to radiation. Typically, this is ultraviolet light having a wavelength of from about 360 nm to about 370 nm, at a power of from about 80 $W/cm^2$ to about 100 $W/cm^2$, and applied for about 1 to about 5 minutes.

The bonding material formed depends upon the components of the initial bonding composition. Bonding compositions, which contain hydrolysis products of one or more modifiers, form bonding materials containing a silicon oxide matrix (i.e., a Si—O—Si network), in which a portion of the silicon atoms are directly bonded to substituted or unsubstituted hydrocarbon moieties.

Where the bonding composition contains a hydrolysis proiduct of an inert network modifier, or a polydialkylsiloxane, the hydrocarbon moieties are unsubstituted alkyl or aryl moieties. Where the bonding composition contains a hydrolysis product of an active network modifier, the hydrocarbon moieties are substituted alkyl or aryl moieties. Where the bonding composition contains a hydrolysis product of an organic network-forming modifier, the hydrolyzed moieties are substituted alkyl or aryl moieties, such as alkylene or arylene moieties. The alkylene or arylene moieties are bonded on either end to silicon atoms of the extended silicon-oxide matrix. This forms Si—R—R'—R—Si bonds wherein R is an alkylene moiety, and R' represents the product of the organic functional groups contained in the modifier.

Where the hydrolyzed bonding composition contains a hydrolysis product of a reactive polymerizable modifier other than a polydialkylsiloxane, the hydrocarbon moieties are substituted alkyl or aryl moieties, such as those containing alkylene or arylene moieties having the formula —R—. The alkylene or arylene moieties are bonded on either end of silicon atoms to form Si—R—Si bonds.

The fraction of silicon atoms directly bonded to substituted or unsubstituted alkyl moieties can be from about 4% to about 100%, preferably from about 20% to about 100%, most preferably from about 50% to about 100%.

Hydrolyzed bonding compositions which contain non-interacting, interpenetrating network modifiers or their hydrolysis products form bonding materials containing an extended silicon oxide matrix (i.e., a Si—O—Si network) and an interpenetrating, organic, polymeric matrix. The extended silicon-oxide matrix and polymeric matrix are not bonded to one another so that substantially none of the atoms in the polymeric matrix are bonded atoms in the extended silicon-oxide matrix.

In practice, solutions may be prepared by dissolving organo-alkoxysilanes in ethanol or dimethylformamide and bringing to reflux. A mixture of ethanol, water, and HCl is added and the sol allowed to reflux 30 minutes. The reaction vessel is then capped and cooled.

Generally, on cooling, the sols possessed a viscosity of about 5 cps. The solutions increased in viscosity with time, the rate of viscosity change depending primarily on the solid and solvent type. Shelf life was extended by making dilute solutions or by using DMF as a co-solvent with ethanol. Typical working viscosities were 5 to 45 cps. These viscosities could be obtained by aging dilute sols, or by concentrating low viscosity sols by rotary evaporation.

The intended characteristic for each of the components included in formulations were: methylacryloxypropyltriethoxysilane (MEMO) for formation of intramolecular interpenetrating network via a reactive polymeric modification with ultraviolet photocure capability; methyltriethoxysilane (MTES) inert network modification of the otherwise Si—O$_4$ network (these components impart hydrophobicity to gels); PTFS to incorporate fluorine into silicate structure and minimize/eliminate hydroxyl (silanol) from the gel structure; tetraethoxygermanium (TEGe) and tetrabutoxytitanium (TBTi) to modify the network with high index of refraction components.

Germanium and titanium are added as alkoxides to base compositions. Both Ge and Ti hydrolyze rapidly, so control is achieved by prehydrolyzing a silaneethoxy mixture with sub-stoichiometric water to form a clear fluid sol. A dilute solution of the Ge or Ti alkoxide in ethanol is then added to the sol.

Fluoride is added to sols via phenyl trifluorosilane precursor. Liquid PTFS was added to the solution. The fluoride, however, causes acceleration of the gelation process. To maintain a fluid sol with good workability, the Si—OR:H$_2$O ratio is increased from 0.5 to 1.0 or more. It was determined that, when using PTFS or other fluoride sources, acid addition is not necessary. Following addition of the water, the hydrolyzed mixture is preferably warmed at 40 to 50° C. rather than at hard reflux. Using these techniques, a fluid and water clear final precursor is produced.

Mass loss in the system was found in three regions: from 20° to 100° C., which is drying of solvent and excess water; from 100° to 300° C., which can be attributed primarily to water evolved from completion of hydrolysis and condensation reactions that increase the skeletal density of the gel; and from 300° to 600° C., which arises from decomposition and oxidation of non-hydrolytic organic modifiers Shrinkage stresses are expected to accompany significant mass loss, as well as skeletal densification processes.

Optimization of the process involves maximizing the extent of hydrolysis and condensation at low temperatures (where gel is soft and compliant) and providing sufficient stress relaxation in the dense structure to accommodate any high temperature shrinkage. Fluoride gels provide higher temperature stability. Their low organic content also favors low mass loss and fewer thermally activated densificition events. On the other hand, it is the incorporation of organic modifiers that gives structural flexibility to the gel.

For application in conventional optical fiber networks, the ideal index of refraction is about 1.46, the index of refraction of the glass material commonly used for the optical fiber cores. Compositional effects, such as a methyl function, or structural effects, such as porosity in the material, can significantly lower isiiex of refraction. To increase the index of refraction, small portions of the silica are replaced with germania or titania.

The index of refraction may also be varied by incorporating phenyltrialkoxysilane, diphenyldialkoxysilane, phenyltrifluorosilane, or combinations thereof into the composition. Compositions with 8% polydimethylsiloxane, between 0 and 80% phenyltriethoxysilane and/or phenyltrifluorosilane, and the remainder methyltriethoxysilane were made and converted to clear discs heated to 250° C. The index of refraction at 588 nm measured by comparison with a series of standard index of refraction oils using the Becke line method. Table 3 details the silicon relationship of the various compositions and their indices of refraction. Thus, the index of refraction for these composition may be varied between 1.39 and 1.55.

TABLE 3

| (Si—C6H5)/(Total SI) | Index of Refraction |
|---|---|
| 0 | 1.39 |
| 9 | 1.43 |
| 27 | 1.47 |
| 80 | 1.55 |

The transmission properties of the present material formulations at wavelengths of 1310 nm and 1550 are particularly useful attributes. In general, the optical spectrum of these hybrid materials in the near infrared (IR) is dominated by vibrational overtones from the organic modifiers and from incompletely reacted silanol groups. The formulations of the invention have been carefully designed to minimize the number of vibrational modes. This renders the overtone and combination and spectrum in the near IR as uncomplicated as possible.

Only C—H and SiO—H stretches and phenyl group bending modes are active in the near IR. The positions of the C—H stretch overtone bands are from 1630 to 1750 nm and 1150 to 1200 nm. The position of the silanol stretching band is from 1370 to 1410 nm. Phenyl group ring bending is active in the region from 1700 to 2000 nm.

Only the incompletely condensed silanol is a non-essential part of the structure. Its content may be kept to a minimum by the unusual ability of the material to undergo a high degree of condensation while still in a viscous state.

Silanol content may also be minimized by incorporation of floride in a formulation.

A low silanol content in the final material is important to minimize the presence of the undesired absorption bands. The absorbance at the optical windows of 1310 nm and 1550 nm is thus driven to every low levels. This is particularly important since major telecommunication application operate at these windows.

Even the low losses thus obtained may be significant in some cases. Thus, absorption tails or combination bands may still cause undue loss at the 1310 or 1550 nm window. Hybrid materials can be made to reduce such absorption by using precursors with deuterium exchanged organic groups. When precursors such as $CD_3Si(OC_2H_5)_3$ and $C_6D_5Si(OC_2H_5)_3$ are employed, the siloxane network becomes modified with $CD_3$ and $C_6D_5$ groups. The C—D vibrational frequencies shift to lower energies from the same C—H mode, and the overtones then are shifted as well. In this manner the overall absorbance in the near IR region can be reduced. This results from absorption tails being smaller, and interfering features being higher order overtones, which possess fundamentally lower intensity. The use of deuterium oxide as the water source can also minimize the effect of the SiOH absorption at 1380 nm since the absorbance position of the SiO-D is at about 2000 nm.

The invention is further described with reference to the following specific applications:

EXAMPLE 1
Hard Pigtailing With A Sol-Gel Adhesive

The pigtail process with present materials was evaluated by aligning two fibers and joining them with a drop of a sol. A sol was prepared from a mixture of 17 parts polydimethylsilane, 21 parts methyltriethoxysilane and 62 parts tetrathoxysilane. A drop of the sol was placed on the joint. A brief reoptimization of the 1550 nm signal was performed. The joint was then heated with a convective heat source held at a distance of about 5 cm until the joint became rigid and, then, for an additional minute.

Losses that could be expected from the hybrid joint were measured in the following manner. Two fibers were aligned on an optical bench. Light from a 1550 nm laser was passed through one fiber, through the air gap ($25\mu$), and through the second fiber with a minimal loss.

Losses relative to the original alignment with the air interface were measured at each stage. The initial effect of applying a drop of liquid sol was a net optical gain of about 0.1 to 0.3 db. After initial realignment, this increased to as high as 0.7 db. Thermal exposure generally caused significant fluctuation in the signal, giving high losses during application of heat. However, the signal generally returned to a low loss as the heat was removed and the sample cooled. The fiber was gently realigned, and a net gain of 0.5 to 1.0 db versus the original air gap alignment was observed. No scattering or absorptive losses were observed.

A hot air gun was directed on the wet joint to provide a 110° C. temperature. Strong joints that could support a 10 gram tensile load were rapidly fabricated in this way.

EXAMPLE 2
Hard Pigtailing Two Fibers Using MTES-Rich Bonding Compositions

A sol having a composition of 8% polydimethylsiloxane (PDMS), 83% methyltriethoxysilane (MTES), and 9% phenyltrifluorosilane (PTFS) on a molar basis was prepared by measuring 35.6 cc MTES, 1.33 cc PDMS, and 2.67 cc PTFS into a capped Nalgene centrifuge tube.

The mixture was heated to 70° C. and then was mixed with 5.4 cc water. The water initially phase separated in the mixture, but, after 20 to 30 minutes of vigorous shaking, the solution homogenized to a single phase. The sol was as warmed for an additional 30 minutes and then cooled. The product was a clear colorless sol with a viscosity of about 5 to 10 centipoise. The sol was allowed to air dry for 1 day providing a sol with viscosity of $10^3$ poise.

Two fibers were aligned on an optical bench so that light from a 1550 nm laser passed through one fiber, through an air gap of $25\mu$, and then through the second fiber with minimal loss. A small drop of the sol was placed onto the joint. Due to the surface tension of the fiber, a slight displacement of the fiber occurred. The fibers were realigned to achieve a minimum optical loss through the fibers and uncured adhesive. The joint was then exposed to a directed, heated air stream for 2 minutes to achieve a 235° C. temperature and then allowed to cool. The cooled joint was hard and robust. A polymeric methacrylate was used to bond the fibers to a silica chip to prevent fracture of the joint by stresses that develop from normal handling.

Optical losses were measured throughout the process and are presented in Table 4 for three samples. The improvement in optical power transmitted through the gap between the fibers when the bonding composition was employed demonstrates the quality of the optical joint.

TABLE 4

| Sample Number | Power Air Gap | Power Sol Applied | Power at 235° C. | Power Mounted |
|---|---|---|---|---|
| 1 | 11.5 dBm | 11.5 dBm | 11.1 dBm | 11.1 dBm |
| 2 | 11.5 dBm | 11.9 dBm | 12.1 dBm | 11.3 dBm |
| 3 | 11.9 dBm | 10.9 dBm | 11.1 dBm | 11.0 dBm |

EXAMPLE 3
Hard Pigtailing a Fiber and an Optical Waveguide

A fiber was aligned with the core of a planar waveguide on an optical bench. Light from a 1550 nm laser was passed through one fiber, through an air gap of $10\mu$, and through the waveguide with minimal loss. A small drop of the sol of Example 2 was placed onto the waveguide and fiber, filling the gap. Due to the surface tension of the fiber, a slight displacement of the fiber occurred. The fiber was repositioned to achieve a minimum optical loss through the complete optical system. The joint was then heated with a directed, heated air stream for 2 minutes to achieve a 235° C. temperature. Upon cooling, the joint was hard and robust. A polymeric methacrylate was used to make a rear joint to provide mechanical toughness. Optical losses were measured throughout the process and are presented in Table 5 for three chips made in this way. The low losses and/or improvement in optical power demonstrate the quality of the optical joint.

TABLE 5

| Sample Number | Power Air Gap | Power Sol Applied | Power at 235° C. | Power Mounted |
|---|---|---|---|---|
| 1 | 14.4 dBm | 14.3 dBm | 16.0 dBm | 14.6 dBm |
| 2 | 21.4 dBm | 20.9 dBm | 20.0 dBm | 19.9 dBm |
| 3 | 13.9 dBm | 13.9 dBm | 15.0 dBm | 14.0 dBm |

EXAMPLE 4
Mechanical Adhesion

An optical fiber was stripped of its protective polymeric coating and cleaned in isopropanol. A silica slide was similarly cleaned and the fiber placed on the slide surface. A drop of the bonding composition of Example 2 having a viscosity of $10^5$ poise was placed on the fiber and glass slide to provide a 2 mm diameter adhesive drop. The sample was oven-heated to 200° C. at a rate of 1° C. per minute and then cooled.

The strength of the bond was measured for 5 samples in a tensile test by gripping both the fiber and the slide and measuring the force required to debond the two. Of the 5 samples, one sample failed by delamination of the adhesive from the glass slide at a load of 0.9 lbs. The others failed at loads of 1.2 to 1.4 lbs.

EXAMPLE 5
Using the Bonding Composition to Fill Voids

This example describes loss reduction with a bonding composition in a network that provides a function in a lightpath, such as polarizing or filtering the light.

A sol having a composition of 8% PDMS, 66% MTES, 9% PTFS and 17% phenyltriethoxysilane (PTES) on a molar basis was prepared in accordance with Example 2. The sol was allowed to age in a capped vial for three days and then air dried for 1 day. This provided a sol with viscosity of 1 poise. A 300-micron deep, 50-micron wide slot, was machined into a straight waveguide. Transmission loss across the slot with and without an index of refraction oil (n=1.46) was measured. The measured losses include transmission losses in the waveguide, reflective losses at the two interfaces of the slot, and losses due to beam spreading in the slot.

The slot was cleaned, and a small drop of the bonding composition was placed on the slot completely filling the slot. The waveguide was then heated to 250° C. and cooled. The resulting filled slot was crack free. The transmission loss at 1550 nm was compared to the loss with an index of refraction oil. The transmission loss for a slot having an air gap loss of 6.0 db was reduced to 3.3 db when the slot was filled with index of refraction oil and to 3.0 db when filled with the bonding composition. The transmission loss for a slot having an air gap loss of 7.8 db was reduced to 4.2 db when the slot was filled with index of refraction oil and to 3.9 db wnen filled with the hydrolyzed bonding composition. The low losses measured after filling the slot with the bonding composition demonstrate the quality of the optical adhesive for use with drop-in components.

EXAMPLE 6
Refractive Index

The sol composition of Example 5 was employed as a base composition. Additional sols were prepared having small compositional changes. Cured bond samples were produced for refractive index measurements. Based on the measurements, it was determined that the refractive index was dependent on the ratio of MTES to the sum of PTFS+ PTES. Specifically, the refractive index can be varied from about 1.45 to 1.47 by varying the ratio from 69 MTES:14 PTFS+9 PTES to 63 MTES:20 PTFS+9 PTES. The PDMS content is maintained constant at 8%.

EXAMPLE 7
Hard Pigtailing With Rapid Cures

A fiber and planar waveguide were aligned as described in Example 3. A drop of sol made in accordance with the composition of Example 5 was placed onto the waveguide and the fiber, filling the 5 to 10 micron gap between them. A $CO_2$ laser beam was used to heat the fiber-sol-waveguide junction. The laser beam used was about 1 to 2 watts, and was unfocused (nominal 8 mm diameter). A ceramic mask intercepted all but a 2 mm zone in the center of the beam, and was aligned to allow the beam to illuminate the bonding material. The beam heated the junction to a temperature of 250° C. within 30 seconds, and then was extinguished. The total time required to heat and cool the joint was less than two minutes. Upon cooling, the joint was hard and robust. A polymeric methacrylate-urethane formulation was used to make a rear joint.

Optical loss at 1550 nm was measured during the pigtailing process for each joint. The excess loss, defined as the sum of all losses in pigtailing the input and output of a waveguide, was measured for each waveguide. Table 6 presents the data that shows that very low losses can be achieved with this rapid process method. Back reflectance values at 1550 nm are typically <−48 dB, which is indicative of the close match of the bonding composition to the waveguide core index of refraction. Back reflectance values for polymer optical adhesives are usually about −35 dB. These results show that the optical characteristics of the subject bonding material are equivalent or superior to organic adhesives.

TABLE 6

| Sample Number | Loss During Pigtail Process (dB) | Excess Loss (dB) |
| --- | --- | --- |
| Input 1 | 0.19 | |
| Output 1 | 0.02 | 0.10 |
| Input 2 | 0.05 | |
| Output 2 | 0.00 | 0.10 |

EXAMPLE 8
Damp Heat Durability

The 1 by 4 splitter described in Example 7 was fusion spliced to fiber connected to a light source at the input and to a detector at the outputs. The butputs were connected through an optical switch that allowed sequential loss measurements at 1550 nm to be acquired for all four channels. The pigtailed chip was placed in an environmental chamber in which an 85° C. temperature and 85% relative humidity condition was established. The optical loss was monitored hourly to determine the effect of damp heat on the hard pigtailed joints.

Table 7 provides the excursion, defined by the difference between the maximum and minimum optical power during the test, and the drift, defined by the different between the final optical power and the starting optical power, for these four waveguides. The results are for aging times of 650 hours. Also provided are the results obtained with a commercial methacrylate-urethane optical adhesive. The sol-gel bonding composition provides excursions of less than 0.15 dB and drift values of <0.10 dB, in contrast to the values obtained with polymeric adhesives of 0.5 dB excursion and 0.2 dB drift.

TABLE 7

Excursion and drift during 650 hours of aging at 85° C. and 85% relative humidity.

| Sample Number | Excursion (dB) | Drift (dB) |
| --- | --- | --- |
| 1 | 0.10 | 0.02 |
| 2 | 0.12 | 0.01 |

EXAMPLE 9
Thermal Cycling Durability

Three pigtailed fiber-to-chip joints made as described in Example 7 were fusion spliced to fiber connected to a light source at the input and to a detector at the outputs. The outputs were connected through an optical switch that allowed sequential loss measurements to be acquired for all four channels. The chip was then placed into a programmable oven and cycled from −40° to +80° C. for ten cycles. The excursion, defined by the difference between the maximum and minimum optical power during the test, and the drift, defined by the difference between the final optical power and the starting optical power, are presented in Table 8. A second test extended the cycling temperature to −60/+ for two cycles, and −70 to +180° C. for two cycles. The results show the ability to maintain excursions of less than 0.2 dB under the standard testing conditions, and also under far more rigorous temperature extremes. These data show a significant improvement over organic polymer optical adhesives since these fail at or near their Tg values, which are in the 100–130° C. range.

TABLE 8

| Sample Number | Excursion 10 cycles | Drift −40/+80° C. | Excursion 2 cycles each | Drift −40/+80° C., −70 + 180° C. |
|---|---|---|---|---|
| | | (dB) | | |
| 1 | 0.10 | 0.02 | 0.12 | 0.10 |
| 2 | 0.12 | −0.01 | 0.15 | 0.07 |
| 3 | 0.17 | 0.05 | 0.25 | 0.00 |

Although the invention has been described in detail for the purpose of illustation, it is understood that such detail is solely for that purpose, and variations can be made therein by those skilled in the art without departing from the spirit and scope of the invention which is defined by the following claims.

We claim:

1. An optically transmissive inorganic-organic hybrid bonding material comprising an extended matrix containing silicon and oxygen atoms with at least a fraction of the silicon atoms in the extended matrix being directly bonded to substituted or unsubstituted hydrocarbon moieties.

2. An optically transmissive inorganic-organic hybrid bonding material in accordance with claim 1 wherein the fraction of silicon atoms directly bonded to a hydrocarbon moiety is at least 4%.

3. An optically transmissive inorganic-organic hybrid bonding material in accordance with claim 2 wherein the fraction of directly bonded silicon atoms is at least 50%.

4. An optically transmissive article comprising, two optically transmissive components connected with a bond of the inorganic-organic hybrid material of claim 1.

5. An optically transmissive article according to claim 4 wherein the two optically transmissive components are selected from a group consisting of optical fibers, planar optical waveguides, and optically active components.

6. An optically transmissive article according to claim 5 wherein the optically transmissive components are both optical fibers.

7. An optically transmissive article according to claim 5 wherein one optically transmissive component is an optical fiber and the other optically transmissive component is a planar optical waveguide.

8. An optically transmissive article according to claim 4 wherein said first optically transmissive component is a planar optical waveguide having a slot cut therein and said second optically transmissive component is an optically active component positioned in the slot.

9. An optically transmissive article according to claim 4 wherein the material comprises a hydrolyzed and cured silane selected from the group consisting of tetraalkoxysilanes, alkyltrialkoxysilanes and aryltrialkoxysilanes.

10. An optically transmissive article according to claim 4 wherein the hydrocarbon moieties are derived from organic modifiers selected from the group consisting of inert network modifiers, active network modifiers, organic network forming modifiers, reactive polymeric modifiers and reactive polymerizable modifiers.

11. An optically transmissive article according to claim 4 wherein the material comprises an interpenetrating organic polymeric matrix.

12. An optically transmissive article according to claim 11 wherein substantially no atom in the interpenetrating organic polymeric matrix is covalently bonded to an atom in the extended silicon-oxygen matrix.

13. An optically transmissive article according to claim 4 wherein the hydrocarbon moieties are unsubstituted or substituted alkyl or aryl moieties.

14. An optically transmissive article according to claim 13 wherein the hydrocarbon moiety is the polymerized product of a modifier covalently bonded to the extended silicon-oxygen network via a Si—C bond.

15. An optically transmissive article according to claim 4 wherein the bond contains fluorine.

16. An optically transmissive article according to claim 4 wherein the bond contains an element for enhancing refractive index selected from the group consisting of Ge, Ti, Zr, Hf, Er and Nd.

17. An optically transmissive article according to claim 4 wherein the selected element is Ge or Ti.

18. An optically transmissive article according to claim 4 wherein the fraction of silicon atoms directly bonded to the substituted or unsubstituted hydrocarbon moieties is at least about 4 percent of the total silicon atoms.

19. An optically transmissive article according to claim 4 wherein hydrogen is replaced by deuterium in the hydrocarbon moieties.

20. A method of making an article composed, in part at least, of the bonding material of claim 1 which comprises,
preparing a precursor composition including at least one silane selected from the group consisting of tetraalkoxysilanes, alkyltrialkoxysilanes, and aryltrialkoxysilanes and a source of a hydrocarbon moiety, and
at least partially hydrolyzing and curing the precursor composition to a viscosity suitable for forming the article, and forming an article of desired shape from the viscous material.

21. A method according to claim 20 which further comprises completing hydrolysis and curing of the shaped article under conditions effective to form an inorganic hybrid material that comprises an extended matrix containing silicon and oxygen atoms with at least a fraction of the silicon atoms being directly bonded to substituted or unsubstituted hydrocarbon moieties.

22. A method in accordance with claim 20 wherein the article is optically transmissive and comprises, in part at least, the inorganic-organic hybrid material of claim 1.

23. A method in accordance with claim 22 wherein the article is a bond between two optically transmissive components and the method further comprises partially hydrolyzing and curing the precursor, composition to form a bonding composition,
aligning the components in a spaced relationship to form a gap,
filling the gap with the bonding composition to form a connection between the curing components, and completing hydrolysis and curing of the bonding composition under conditions effective to form a bond of an inorganic-organic hybrid material that comprises an extended matrix containing silicon and oxygen atoms with at least a fraction of the silicon atoms being directly bonded to substituted or unsubstituted hydrocarbon moieties, whereby the optically transmissive components are connected together.

24. A method according to claim 23 wherein both of the optically transmissive components are optical fibers and wherein said aligning comprises:

butting together ends of the optical fibers and withdrawing the ends (end and edge) to form a gap to be filled by the bonding composition.

25. A method according to claim 23 wherein the first optically transmissive component is an optical fiber and the second optically transmissive component is a planar optical waveguide and wherein said aligning comprises:

butting an end of the optical fiber with an edge of the planar optical waveguide and withdrawing the ends (end and edge) to form a gap to be filled by the bonding composition.

26. A method according to claim 23 wherein the first optically transmissive component is a planar optical waveguide, a slot is cut therein, the second optically transmissive component is an optically active component, and the second component is aligned in the slot of the planar optical waveguide.

27. A method according to claim 23 which comprises applying the bonding composition to at least one of the components at its contact point.

28. A method according to claim 23 which comprises aligning the components in a spaced relationship and bonding the components with a bonding composition that fills the space.

29. A method according to claim 22 which further comprises incorporating in the bonding composition precursor a source of fluorine.

30. A method according to claim 22 which further comprises incorporating in the bonding composition precursor a source of germanium or titanium.

31. A method according to claim 22 which further comprises incorporating in the bonding composition precursor a modifier selected from the group consisting of inert network modifiers, active network modifiers, organic network-forming modifiers, reactive polymeric modifiers, reactive polymerizable modifiers, and non-interacting, interpenetrating network modifiers.

32. A method according to claim 22 which comprises aging the bonding composition precursor for a period of time.

33. A method according to claim 32 which comprises aging the bonding composition precursor by heating at a temperature under 100° C. for a period up to 5 hours.

34. A method according to claim 22 which comprises removing the alcohols produced during hydrolysis of the bonding composition precursor to avoid cracking during bond formation.

35. A method according to claim 22 which comprises preparing a bonding material consisting essentially of PDMS, MTES, PFTS and PTES and varying the ratio of MTES:PTFS+PTES to control the refractive index.

36. A method according to claim 25 which comprises preparing a bonding composition containing about 8% PDMS, 63–69% MTES, 20–14% PTFS and about 9% PTES, the contents representing the proportion of silicon atoms in the composition, the composition producing a bond having a refractive index of 1.45–1.47 at 632 nm.

37. A method in accordance with claim 22 which comprises replacing hydrogen in the hydrocarbon moieties with deuterium.

38. A hydrolyzable and curable bonding sol-gel composition comprising:

one or more silanes, selected from the group consisting of a tetraalkoxysilane, an alkyltrialkoxysilane, and an aryltrialkoxysilane and a source of substituted or unsubstituted hydrocarbon moieties.

39. A composition in accordance with claim 38 in which the selected silane constitutes at least 50% of the composition.

40. A composition in accordance with claim 38 wherein the sol-gel composition further comprises an organic component selected from the group consisting of inert network modifiers, active network modifiers, organic network-forming modifiers, reactive polymeric modifiers, reactive polymerizable modifiers, non-interacting, and interpenetrating network modifiers.

41. A composition according to claim 40 wherein a selected inert network modifier is an (alkyl)alkoxysilane, or an (aryl)alkoxysilane.

42. A composition according to claim 40 wherein a selected organic network-forming modifier is an (alkacryloxyalkyl) alkoxysilane, a vinylsilane or an (acryloxyalkyl) alkoxysilane, an (epoxy-substituted alkyl) alkoxysilane.

43. A composition according to claim 40 wherein a selected reactive polymeric modifier is a silanol-terminated polydialkylsiloxane, or a trialkoxysilyl-terminated polydialkylsiloxane.

44. A composition according to claim 38 wherein the hydrolyzable and curable, bonding sol-gel composition further comprises a polydialkylsiloxane.

45. A composition according to claim 38 wherein the hydrolyzable and curable, bonding sol-gel composition further comprises an (alkacryloxyalkyl) alkoxysilane.

46. A composition according to claim 45 wherein the hydrolyzable and curable, bonding sol-gel composition further comprises a photoinitiator.

47. A composition according to claim 38 wherein the hydrolyzable and curable, bonding sol-gel composition further comprises at least one alkoxide of an element selected from the group consisting of Ge, Ti, Zr, Hf, Er, Nb and combinations thereof.

48. A composition according to claim 38, wherein the hydrolyzed composition further comprises a fluorine source.

49. A hydrolyzable and curable bonding sol-gel composition in accordance with claim 38, comprising:

a silane selected from the group consisting of a tetralkoxysilane, an alkyltrialkoxysilane, and aryltrialkoxysilane, a trialkoxysilane, and alkacryloxypropyltrialkoxysilane, and combinations thereof, in a total amount of from about 50 to about 95 mole % of the sol-gel composition;

a network modifier selected from the group consisting of a monomeric dialkyldialkoxysilane and a polymeric polydialkylsilane in an amount of from about 4 to about 25 mole % of the sol-gel composition;

an aryltrifluorosilane in an amount of from about 5 to about 20 mole % of the sol-gel composition;

a tetraalkoxytitanium in an amount of from about 0 to about 10 mole % of the sol-gel composition; and a tetraalkoxygermanium in an amount of from about 0 to about 20 mole % of the sol-gel composition.

50. A composition in accordance with claim 38 wherein hydrogen atoms are replaced by deuterium atoms.

* * * * *